US012055320B2

(12) United States Patent
Kwon et al.

(10) Patent No.: US 12,055,320 B2
(45) Date of Patent: Aug. 6, 2024

(54) OUTDOOR AIR CLEANING SYSTEM

(71) Applicant: Samsung Electronics Co., Ltd., Suwon-si (KR)

(72) Inventors: Hyukjae Kwon, Suwon-si (KR); Taeksoo Kim, Seoul (KR); Hyun Chul Lee, Hwaseong-si (KR); Joonseon Jeong, Seoul (KR); Inhyuock Cho, Yongin-si (KR); Sangmin Ji, Yongin-si (KR); Jaeseung Han, Hwaseong-si (KR); Jinkyu Kang, Hwaseong-si (KR); Ilhwan Kim, Yongin-si (KR); Kitae Park, Seoul (KR); Seokwhan Chung, Hwaseong-si (KR); Hyoungwoo Choi, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 655 days.

(21) Appl. No.: 17/109,628

(22) Filed: Dec. 2, 2020

(65) Prior Publication Data

US 2021/0172631 A1 Jun. 10, 2021

(30) Foreign Application Priority Data

Dec. 4, 2019 (KR) .................. 10-2019-0160001

(51) Int. Cl.
*F24F 8/99* (2021.01)
*B01D 46/00* (2022.01)
*B01D 46/44* (2006.01)
*B01D 53/02* (2006.01)
*F24F 1/48* (2011.01)
*F24F 1/56* (2011.01)
(Continued)

(52) U.S. Cl.
CPC ............ *F24F 8/99* (2021.01); *B01D 46/0032* (2013.01); *B01D 46/0049* (2013.01);
(Continued)

(58) Field of Classification Search
CPC ............ F24F 8/99; F24F 9/00; B01D 46/0032
See application file for complete search history.

(56) References Cited

U.S. PATENT DOCUMENTS

2019/0150628 A1 5/2019 Wennerstrom
2019/0374985 A1* 12/2019 Ko ..................... B08B 15/02
(Continued)

FOREIGN PATENT DOCUMENTS

CN 107060377 A 8/2017
CN 105587139 B 6/2018
(Continued)

OTHER PUBLICATIONS

Extended European Search Report dated May 10, 2021, issued in corresponding European Patent Application No. 20210179.6.
(Continued)

*Primary Examiner* — Kevin Joyner
(74) *Attorney, Agent, or Firm* — Harness, Dickey & Pierce, P.L.C.

(57) ABSTRACT

An outdoor air cleaning system includes a partition surrounding a purification space to isolate the purification space from an external space and having at least one opening connecting the purification space to the external space, an air purifying device configured to supply purified air to the purification space, and a controller configured to control the air purifying device. An openness level defined as an area ratio of the opening with respect to a surface area of the partition is about 10% or more and about 50% or less.

19 Claims, 11 Drawing Sheets

(51) Int. Cl.
　　　*F24F 8/10*　　　　(2021.01)
　　　*F24F 8/20*　　　　(2021.01)
　　　*F24F 9/00*　　　　(2006.01)
　　　*F24F 110/12*　　　(2018.01)
　　　*F24F 110/20*　　　(2018.01)
　　　*F24F 110/52*　　　(2018.01)
(52) U.S. Cl.
　　　CPC .......... *B01D 46/448* (2013.01); *B01D 53/02* (2013.01); *F24F 1/48* (2013.01); *F24F 1/56* (2013.01); *F24F 8/10* (2021.01); *F24F 8/20* (2021.01); *B01D 2279/40* (2013.01); *F24F 2110/12* (2018.01); *F24F 2110/20* (2018.01); *F24F 2110/52* (2018.01)

(56) References Cited

U.S. PATENT DOCUMENTS

2020/0140093 A1\* 5/2020 Vandyke .................. F24F 9/00
2021/0252176 A1\* 8/2021 Nam ....................... F24F 11/30

FOREIGN PATENT DOCUMENTS

| JP | 2018-047446 A | 3/2018 |
| KR | 2003-0042109 A | 5/2003 |
| KR | 2009-0078906 A | 7/2009 |
| KR | 20-2010-0009995 U | 10/2010 |
| KR | 10-2010-0119929 A | 11/2010 |
| KR | 101337152 B1 | 12/2013 |
| KR | 2015-0118464 A | 10/2015 |
| KR | 2018-0080803 A | 7/2018 |
| KR | 2019-0025562 A | 3/2019 |
| KR | 2019-0051803 A | 5/2019 |
| KR | 102050298 B1 | 12/2019 |

OTHER PUBLICATIONS

Korean Office Action dated Jun. 26, 2024 issued in corresponding Korean Appln. No. 10-2019-0160001 (with English translation).

\* cited by examiner

OUTDOOR AIR CLEANING SYSTEM

CROSS-REFERENCE TO RELATED APPLICATION

This application claims the benefit of Korean Patent Application No. 10-2019-0160001, filed on Dec. 4, 2019, in the Korean Intellectual Property Office, the disclosure of which is incorporated herein in its entirety by reference.

BACKGROUND

1. Field

The present disclosure relates to air cleaning systems installed outdoors.

2. Description of Related Art

As air pollution due to particulate matter (PM), harmful gas, or the like becomes more severe, attempts to purify air in particular outdoor regions for safe outdoor activities are underway. Such attempts to purify outdoor air include a method of manufacturing an existing indoor air purifying device in a large size and installing it outdoors, a method of washing out pollutants by artificial rainfall, an air flow method based on destruction of an inversion layer of the atmosphere, or the like. However, in the above methods, due to an air flow occurring in an open outdoor space or the like, a large air purification facility is required to secure a large purification zone and also it is not easy to efficiently removing pollutants such as particulate matter.

SUMMARY

Provided are air cleaning systems capable of efficiently forming a purification zone in an outdoor space.

Additional aspects will be set forth in part in the description which follows and, in part, will be apparent from the description, or may be learned by practice of example embodiments of the disclosure.

According to an aspect of some example embodiments, an outdoor air cleaning system includes: a partition surrounding a purification space to isolate the purification space from an external space and having at least one opening connecting the purification space to the external space; an air purifying device configured to supply purified air to the purification space; and a controller configured to control the air purifying device, wherein an openness level is about 10% or more and about 50% or less.

The openness level may be about 20% or more.

A volume of the purification space may be about 100,000 cubic meters or less.

At least a portion of the partition may be transparent.

The outdoor air cleaning system may further include a movable wall arranged to open and close at least a portion of the opening.

The partition may include a side wall forming a horizontal boundary between the purification space and the external space and an upper wall forming a vertical boundary between the purification space and the external space, and the opening may be in at least one of the side wall and the upper wall.

The outdoor air cleaning system may further include a temperature adjusting device configured to form a temperature gradient between the purification space and the external space.

The outdoor air cleaning system may further include a vertical flow device configured to receive the purified air from the air purifying device and forming a downward air flow from an upper portion of the purification space, wherein the blocking device may include a horizontal flow device configured to receive the purified air from the air purifying device and forming a horizontal air flow along the side wall inside the purification space.

The outdoor air cleaning system may further include a blocking device configured to block unpurified air from flowing from the external space into the purification space through the opening.

The opening may include a first opening in the side wall, and the blocking device may include a vertical blocking device at a vertical edge of the first opening configured to eject the purified air supplied from the air purifying device vertically across the first opening.

The vertical blocking device may eject the purified air toward the purification space at an angle with respect to a vertical direction.

The vertical blocking device may include a downward blocking device at an upper edge of the first opening configured to eject the purified air downward.

The vertical blocking device may include an upward blocking device at a lower edge of the first opening configured to eject the purified air upward.

The blocking device may include a horizontal blocking device at a horizontal edge of the first opening configured to eject the purified air supplied from the air purifying device horizontally across the first opening.

The horizontal blocking device may eject the purified air toward the purification space at an angle with respect to a horizontal direction.

The opening may include a second opening in the upper wall, and the blocking device may include a streamlined dome structure around the second opening.

According to an aspect of some example embodiments, an outdoor air cleaning system includes: a partition surrounding a purification space to isolate the purification space from an external space and having at least one opening connecting the purification space to the external space; and an air purifying device configured to supply purified air to the purification space, wherein an openness level is about 20% or more.

At least a portion of the partition may be transparent.

The outdoor air cleaning system may further include a movable wall arranged to open and close at least a portion of the opening.

The openness level defined as the area ratio of the opening with respect to the surface area of the partition may be about 50% or less.

BRIEF DESCRIPTION OF THE DRAWINGS

The above and other aspects, features, and advantages of some example embodiments of the disclosure will be more apparent from the following description taken in conjunction with the accompanying drawings, in which.

DETAILED DESCRIPTION

Figure 1:
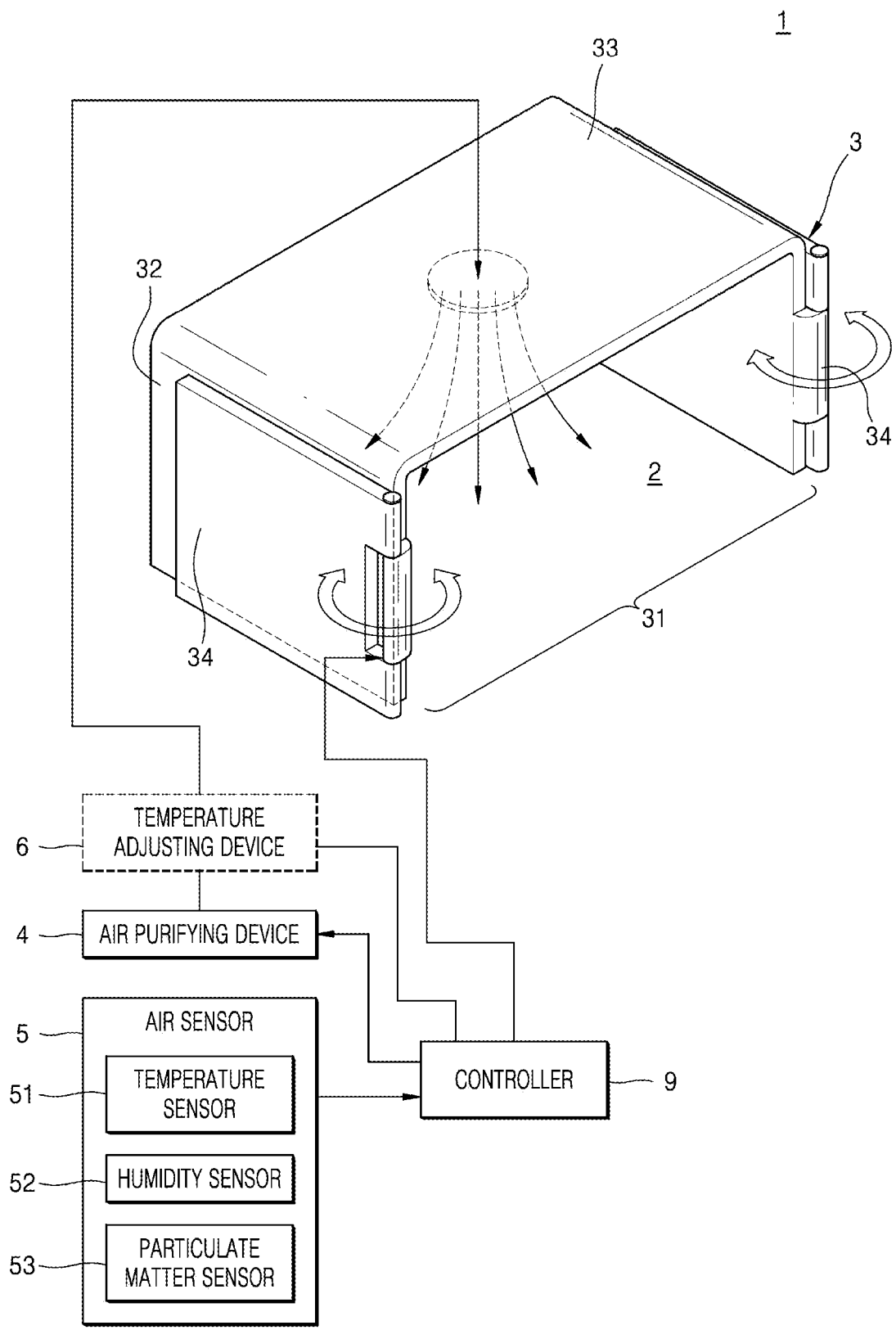
FIG. 1 is a configuration diagram of an air cleaning system according to some example embodiments.

Reference will now be made in detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, some example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, some example embodiments of the present disclosure will be described in detail with reference to the accompanying drawings. In the drawings, like reference numerals may denote like elements, and the size of each element may be exaggerated for clarity and convenience of description.

When the terms "about" is used in this specification in connection with a numerical value, it is intended that the associated numerical value include a tolerance of ±10% around the stated numerical value. When ranges are specified, the range includes all values therebetween such as increments of 0.1%.

FIG. 1 is a configuration diagram of an air cleaning system according to some example embodiments. Referring to FIG. 1, according to some example embodiments, an air cleaning system may include a partition 3 defining a purification space 2 and an air purifying device 4 supplying purified air to the purification space 2. The partition 3 may surround the purification space 2 to isolate the purification space 2 from an external space 1. The partition 3 may partially isolate the purification space 2 from the external space 1. The partition 3 may have one or more openings 31 connecting the purification space 2 to the external space 1. The purification space 2 may be, for example, a bus stop, a playground, a resting space in a park, a bus terminal, a school playground, an outdoor sports stadium, a courtyard of a building, or the like.

The partition 3 may be an artificial structure for isolating the purification space 2 from the external space 1. For example, the partition 3 may surround a bus stop, a playground, a bus terminal, or a resting space in a park to partially isolate the bus stop, the playground, the bus terminal, or the resting space in the park from the external space 1. Also, the partition 3 may be implemented by a structure itself requiring the purification space 2. For example, in the case of a sports stadium, the partition 3 may be implemented by a structure including a grandstand and a wall surrounding a central sports ground. In the case of a courtyard of a building, the partition 3 may be implemented by a building structure surrounding the courtyard.

The purification space 2 may be connected to the external space 1 by the opening 31. That is, the openness of the purification space 2 may be maintained by the opening 31. The opening 31 may have a size capable of ensuring the own utility of the purification space 2. For example, in the case of a bus stop, the opening 31 may have a position, shape, and size for functioning as a passage for a passenger waiting for a bus to move from the external space 1 to the purification space 2 and vice versa. In the case of a playground, a resting space in a park, an outdoor sports stadium, or the like, the opening 31 may have a position, shape, and size for functioning as an access passage of users, and an additional opening 31 may be formed in the partition 3 such that the playground, the resting space in the park, the outdoor athletic stadium, or the like may be open toward the sky. In the case of a courtyard of a building, the opening 31 may be formed in the partition 3 such that the courtyard may be open (upward) toward the sky. One or more openings 31 may be formed in the partition 3 to maintain the functionality and openness suitable for the purpose of use of the facility to which the air cleaning system is applied.

The air purifying device 4 may be a filter device, an electrostatic device, a plasma device, a catalyst device, and/or an adsorption device and may purify the air by various purification methods such as a filter method, an electrostatic method, a plasma method, a catalyst method, and/or an adsorption method. The purified air may be supplied to the purification space 2. The air purifying device 4 may be installed outside the partition 3 to purify the air of the external space 1 and supply the purified air to the purification space 2. The air purifying device 4 may be installed in the purification space 2 to purify the air inside the purification space 2. The air purifying device 4 may be installed in each of the external space 1 and the purification space 2. The air purifying device 4 may be manufactured to supply purified air having a concentration of particulate matter reduced by about 50% or more in comparison with the external air, for example, based on PM2.5 (particulate matters with diameter of equal to or less than 2.5 μm).

The air cleaning system may include an air sensor 5 for measuring the air quality. The air sensor 5 may be installed in the external space 1 or the purification space 2 or both. The air sensor 5 may measure the air quality inside the purification space 2. The air sensor 5 may measure the air quality of the external space 1 around the purification space 2.

The air sensor 5 may include a particulate matter sensor 53 for measuring a concentration of particulate matter in the air. The air sensor 5 may further include a temperature sensor 51 and a humidity sensor 52 for measuring the temperature and humidity of air. Although not illustrated in the drawings, the air sensor 5 may further include a wind speed sensor for measuring a flow rate of air in the external space 1, a gas detection sensor for detecting a gas component in the air of the purification space 2, or the like.

Various types of known sensors may be used as the particulate matter sensor 53. For example, the particulate matter sensor 53 may include a flow meter unit for inducing an air flow and measuring a flow rate and a sensing unit for detecting particulate matter in the air. The sensing unit may be a light scattering device, a weight device, and/or an inertial mass device and may measure the amount of particulate matter in the air by various detection methods, for example, light scattering type, weight type, and/or inertial mass type. The light scattering type detection method may irradiate light to a measurement region through which air passes and receive light scattered by particulate matter to measure the amount of particulate matter. The weight-type detection method may pass air through a filter in a sensor, collect particulate matter, and measure the amount of collected particulate matter. The inertial mass-type detection method may set particulate matter to settle at a particular position and then indirectly measure its weight.

A controller 9 may control the air purifying device 4 based on the detection value of the air sensor 5. The controller 9 may turn on/off the air purifying device 4 or control the operation speed of the air purifying device 4 based on the detection value of the air sensor 5.

According to an outdoor air cleaning system of the related art, the air purifying device 4 is installed in the external space 1. The purified air is supplied around the air purifying device 4. Because the purification space 2 to which the purified air is supplied is not isolated from the external space 1, the flow of air generated in the external space 1 passes through the purification space 2 as it is. Thus, even when the purified air is supplied to the purification space 2, the purified air is difficult to maintain in the purification space 2, and because the air thereof is mixed with the unpurified air introduced from the external space 1, the air cleanliness level of the purification space 2 is difficult to maintain. Also, because the capacity of the air purifying device 4 required per unit volume of the purification space 2 that may be secured is so large, it is difficult to secure the economic efficiency and utility.

According to some example embodiments, the purification space 2 may be partially isolated from the external space 1 by the partition 3. The air inside the purification space 2 and the air in the external space 1 may be partially isolated from each other by the partition 3. The influence of the air flow of the external space 1 on the purification space 2 may be reduced and thus the mixing of the purified air supplied to the purification space 2 and the unpurified air of the external space 1 may be reduced. Also, the purification space 2 may be partitioned by the partition 3 as a space in which the purified air may stay and circulate. Because the purification space 2 may be partially isolated from the external space 1, the air cleanliness level of the purification space 2 may be maintained at a suitable level by using the air purifying device 4 having a smaller purification capacity than the outdoor air cleaning system of the related art. This may mean the improvement of the air purification efficiency against the cost of the air cleaning system and may ensure the feasibility of the outdoor air cleaning system.

The size and/or number of the openings 31 may be determined considering the openness of the purification space 2 and the functionality of the opening 31. The size of the opening 31 may be defined by an openness level defined as an area ratio of the opening 31 with respect to the surface area of the partition 3, as represented in the following equation.

$$\text{Openness Level} = \{(\text{Area of Opening})/(\text{Surface Area of Partition})\} \times 100(\%)$$

As a minimum condition for securing the openness of the purification space 2 and the functionality of the opening 31, the openness level may be about 10% or more. When the openness level is less than about 10%, the purification space 2 may not be distinguished from the internal space of the building and may be substantially difficult to consider as an outdoor air cleaning system.

The openness level of the partition 3 may be about 20% or more in order to define a realistic purification space 2 that is capable of securing the openness and functionality and is installed in an outdoor place such as a bus stop, a playground, a bus terminal, or a resting space in a park.

An excessively great openness level may be disadvantageous for maintaining the air cleanliness level of the purification space 2. The upper limit of the openness level may be determined considering the efficiency and the economic efficiency of the installation cost of the air purifying device 4 capable of maintaining the air cleanliness level of the purification space 2 at a desired level while securing the openness of the purification space 2 and the functionality of the opening 31. Considering this point, the openness level may be about 50% or less and accordingly a particulate matter reduction efficiency of about 50% or more of the purification space 2 may be implemented. Also, the clean air maintenance efficiency of the purification space 2 may be maintained at about 50% or more.

The partition 3 may include a side wall 32 forming a horizontal boundary of the purification space 2 and an upper wall 33 forming a vertical boundary of the purification space 2. One or more openings 31 may be provided in at least one of the side wall 32 and the upper wall 33. In some example embodiments illustrated in FIG. 1, one opening 31 may be provided in the side wall 32. The area of the opening 31 may be about 10% or more of the surface area of the upper wall 33 and the side wall 32 including the opening 31. Considering the openness and functionality, the area of the opening 31 may be about 20% or more of the surface area of the upper wall 33 and the side wall 32 including the opening 31. Considering the efficiency and the economic efficiency of the air cleaning system, the area of the opening 31 may be about 50% or less of the surface area of the upper wall 33 and the side wall 32 including the opening 31.

In order to implement higher openness even at a lower openness level, at least a portion of the partition 3 may be transparent. For example, at least a portion of the side wall 32 may be transparent and the upper wall 33 may also be partially or entirely transparent. Although not illustrated in the drawings, a solar cell for solar power generation may be installed on the upper wall 33. For example, the air cleaning system may include an energy storage system (ESS) for storing electricity generated by the solar cell. The electricity stored in the energy storage system may be used as energy for driving the air purifying device 4, the air sensor 5, a temperature adjusting device 6, the controller 9, and/or the like. Accordingly, an eco-friendly air cleaning system may be implemented.

When the volume of the purification space 2 is excessive, the installation cost of the air purifying device 4 for maintaining the air cleanliness level of the purification space 2 may increase excessively and thus the efficiency and the economic efficiency thereof may decrease. Considering this point, the volume of the purification space 2 may be about 100,000 cubic meters or less.

When the air cleanliness level inside the purification space 2 is very low, it may be necessary to rapidly increase the air cleanliness level of the purification space 2. For example, in the case of a bus stop, a playground, a resting space in a park, a school playground, a bus terminal, a courtyard of a building, or the like, the controller 9 may not operate the air purifying device 4 at midnight because there is no user at midnight. In the case of a sports stadium, the controller 9 may not operate the air purifying device 4 while it is not in use. For example, the air cleanliness level of the purification space 2 may decrease. When the bus stop, the playground, the resting space in the park, the school playground, the bus terminal, the courtyard of the building, or the like is to be re-used in the daytime, or when the sports stadium is to be used, it may be necessary to rapidly increase the air cleanliness level of the purification space 2.

For this purpose, the air cleaning system may include a movable barrier or movable wall 34 for opening and closing at least a portion of the opening 31. When it is necessary to rapidly increase the air cleanliness level of the purification space 2, the controller 9 may drive the movable wall 34 to entirely or partially block the opening 31 to isolate the purification space 2 from the external space 1 and may drive the air purifying device 4 to supply purified air to the purification space 2. Accordingly, the air cleanliness level of the purification space 2 may be rapidly increased. When the air cleanliness level of the purification space 2 reaches a target cleanliness level, the controller 9 may drive the movable wall 34 to open the opening 31.

The movable wall 34 of some example embodiments may be rotatably installed at the side wall 32 to be moved to a position for opening the opening 31 and a position for closing the opening 31. The shape of the movable wall 34 may vary according to various example embodiments. For example, the movable wall 34 may be implemented in a bellows (or accordion) shape that may be installed at the side wall 32 or the upper wall 33 to be reduced/expanded in the vertical direction. Although not illustrated in the drawings, when the opening 31 is provided in the upper wall 33, the movable wall 34 may be installed at the upper wall 33.

The movable wall 34 may be used to open and close the opening 31 to protect the purification space 2 in response to external weather change.

Figure 2:
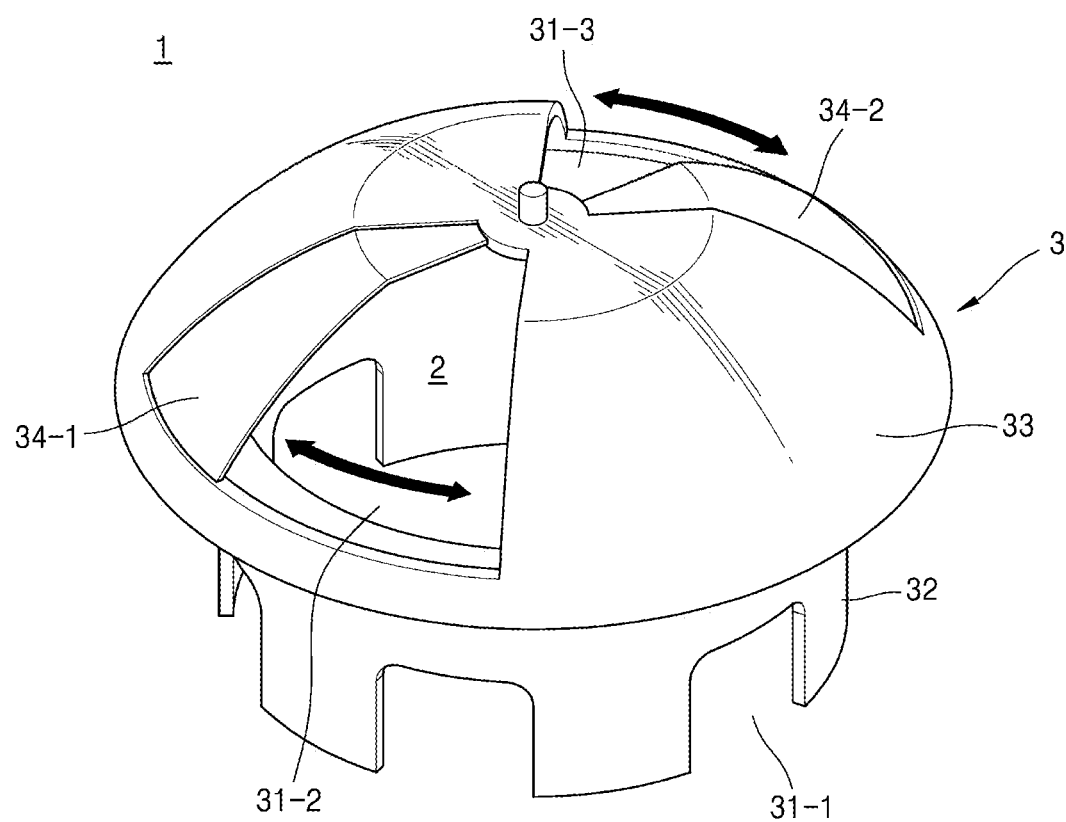
FIG. 2 illustrates a partition according to some example embodiments.

FIG. 2 illustrates some example embodiments of the partition 3. Referring to FIG. 2, a partition 3 may be generally cylindrical and may isolate a purification space 2 from an external space 1. A plurality of first openings 31-1 may be provided in a side wall 32 forming a horizontal boundary of the purification space 2. The plurality of first openings 31-1 may function as an entrance to the purification space 2. An upper wall 33 forming a vertical boundary of the purification space 2 may function as a roof. Second openings 31-2 and 31-3 may be provided in the upper wall 33. Movable walls 34-1 and 34-2 may be provided to open and close the second openings 31-2 and 31-3, respectively. Although not illustrated in the drawings, a movable wall for opening and closing the first opening 31-1 may be provided. At least a portion of the side wall 32 may be transparent. At least a portion of the upper wall 33 may be transparent. For example, the movable walls 34-1 and 34-2 may be transparent.

The sum of the areas of the first openings 31-1 and the second openings 31-2 and 31-3 may be about 10% or more of the surface area of the side wall 32 and the upper wall 33. Considering the openness and functionality, the sum of the areas of the first openings 31-1 and the second openings 31-2 and 31-3 may be about 20% or more of the surface area of the side wall 32 and the upper wall 33. Considering the efficiency and the economic efficiency of the air cleaning system, the sum of the areas of the first openings 31-1 and the second openings 31-2 and 31-3 may be about 50% or less of the surface area of the side wall 32 and the upper wall 33. The purification space 2 may be, for example, a playground, a school playground, a resting space in a park, or the like.

The partition 3 is not limited to the examples illustrated in FIGS. 1 and 2 and may be implemented in various shapes including functional and aesthetic structures.

Referring back to FIG. 1, the air cleaning system may further include the temperature adjusting device 6. The temperature adjusting device 6 may adjust the internal temperature of the purification space 2. The temperature adjusting device 6 may include, for example, an air conditioner (cooler) and/or a heater. The temperature adjusting device 6 may receive purified air from the air purifying device 4, cool or heat the purified air to a desired temperature, and supply the resulting air to the purification space 2. The temperature adjusting device 6 may be installed inside the purification space 2 to cool or heat the purified air to a desired temperature.

By the purified air supplied from the air purifying device 4, the air cleanliness level inside the purification space 2 may be maintained at a suitable level. According to the air cleaning system of some example embodiments, the purification space 2 may be connected to the external space 1 through the opening 31. Thus, the external unpurified air may flow into the purification space 2 through the opening 31. Thus, a blocking device may be required to block the external unpurified air from flowing into the purification space 2 through the opening 31.

As an example, the temperature adjusting device 6 may form a temperature gradient between the purification space 2 and the external space 1 such that air may not flow into the purification space 2 through the opening 31 from the external space 1. That is, the temperature adjusting device 6 may form a temperature gradient between the purified air in the purification space 2 and the external air in the external space 1. The purified air and the external air meet each other at the opening 31. Due to the temperature difference between the purified air and the external air, the external air may be partially blocked from flowing into the purification space 2 through the opening 31. Accordingly, the temperature adjusting device 6 may function as a blocking device.

Figure 3:
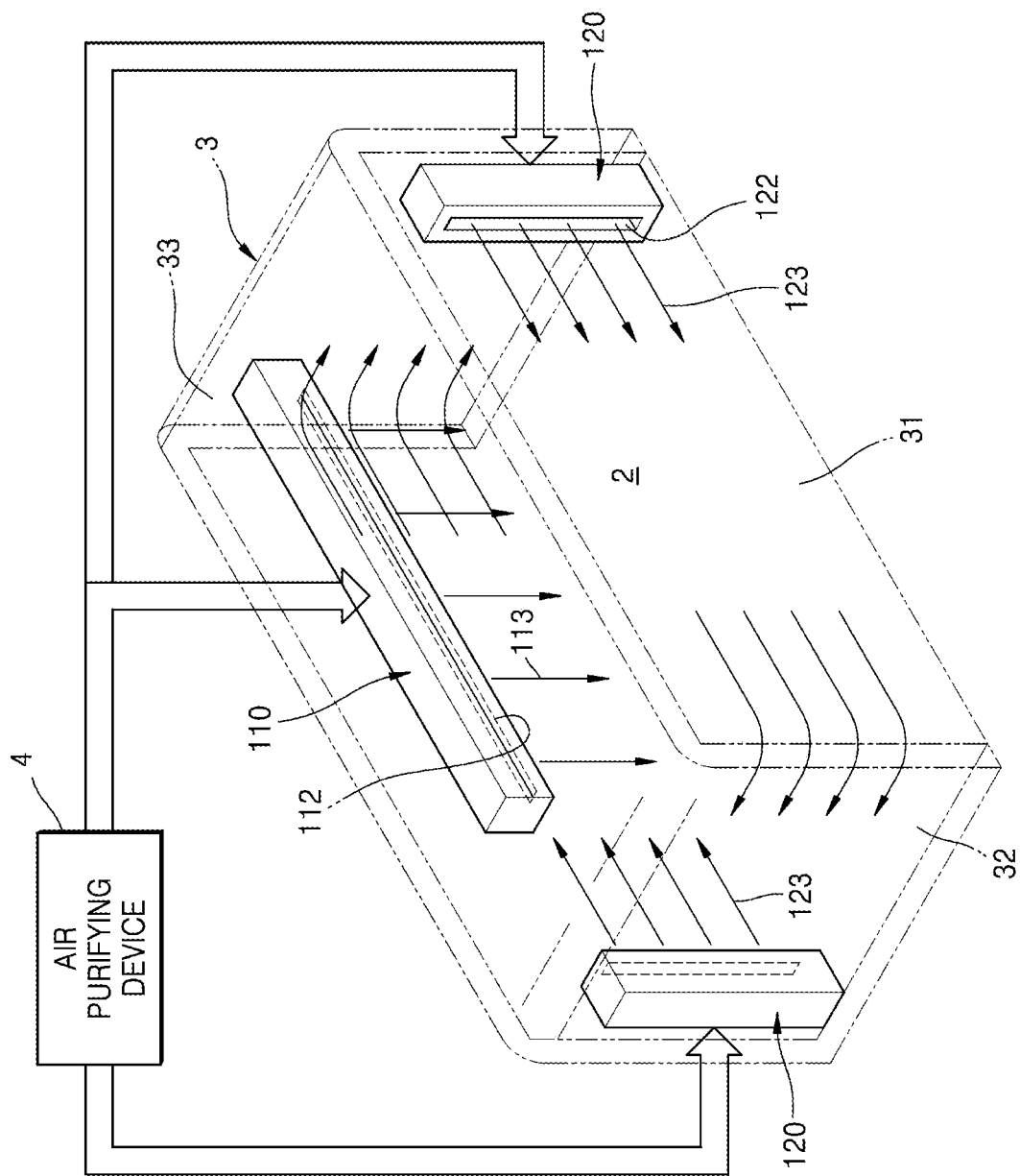
FIG. 3 is a diagram illustrating a blocking device according to some example embodiments.

As an example, the air flow inside the purification space 2 may be used to reduce or prevent the unpurified air from flowing into the purification space 2 or to allow only a little of the unpurified air to flow thereinto. FIG. 3 is a diagram illustrating some example embodiments of a blocking device. In some example embodiments, an air supply structure itself for supplying air to the purification space 2 may also function as a blocking device. Referring to FIG. 3, the air cleaning system may include a vertical flow device 110 that may receive the purified air from the air purifying device 4 and form a downward air flow 113 from an upper portion of the purification space 2. The blocking device may include a horizontal flow device 120 that may receive the purified air from the air purifying device 4 and form a horizontal air flow 123 along the side wall 32 inside the purification space 2.

The vertical flow device 110 may be connected to the air purifying device 4 and may be installed at the upper wall 33. The vertical flow device 110 may include an air discharge port 112 that is open downward. The air discharge port 112 may have a shape extending in the horizontal direction. Although not illustrated in the drawings, the air discharge port 112 may be implemented by a plurality of air discharge ports arranged in the horizontal direction. Although not illustrated in the drawings, the vertical flow device 110 may include a blower for discharging the purified air received from the air purifying device 4, through the air discharge port 112. The blower may be controlled by the controller 9.

The horizontal flow device 120 may be connected to the air purifying device 4 and may be installed at the side wall 32. The horizontal flow device 120 may include an air discharge port 122 that is open in the horizontal direction. The air discharge port 122 may have a shape extending in the vertical direction. Although not illustrated in the drawings, the air discharge port 122 may be implemented by a plurality of air discharge ports arranged in the vertical direction. Although not illustrated in the drawings, the horizontal flow device 120 may include a blower for discharging the purified air received from the air purifying device 4, through the air discharge port 122. The blower may be controlled by the controller 9.

According to this configuration, the downward air flow 113 and the horizontal air flow 123 may be merged with each other to form an air flow circulating in the horizontal direction along the side wall 32 inside the purification space 2 as a whole. The air flow circulating in the horizontal direction may form a blocking wall for blocking the unpurified external air introduced through the opening 31. Thus, the external air flowing into the purification space 2 through the opening 31 provided in the side wall 32 or the openings 32-1, 33-1, and 33-2 provided in the side wall 32 and the upper wall 33 as illustrated in FIG. 2 may be blocked or the amount of the external air flowing thereinto may be reduced.

The horizontal flow device 120 may eject the purified air toward the purification space 2 at an angle with respect to the horizontal direction. For example, the air discharge port 122 may be formed to be inclined toward the purification space 2 with respect to the horizontal direction. According to this configuration, because the purified air ejected through the air discharge port 122 may be directed toward the purification space 2, the amount of leakage of the purified air to the external space 1 may be reduced.

Figure 4:
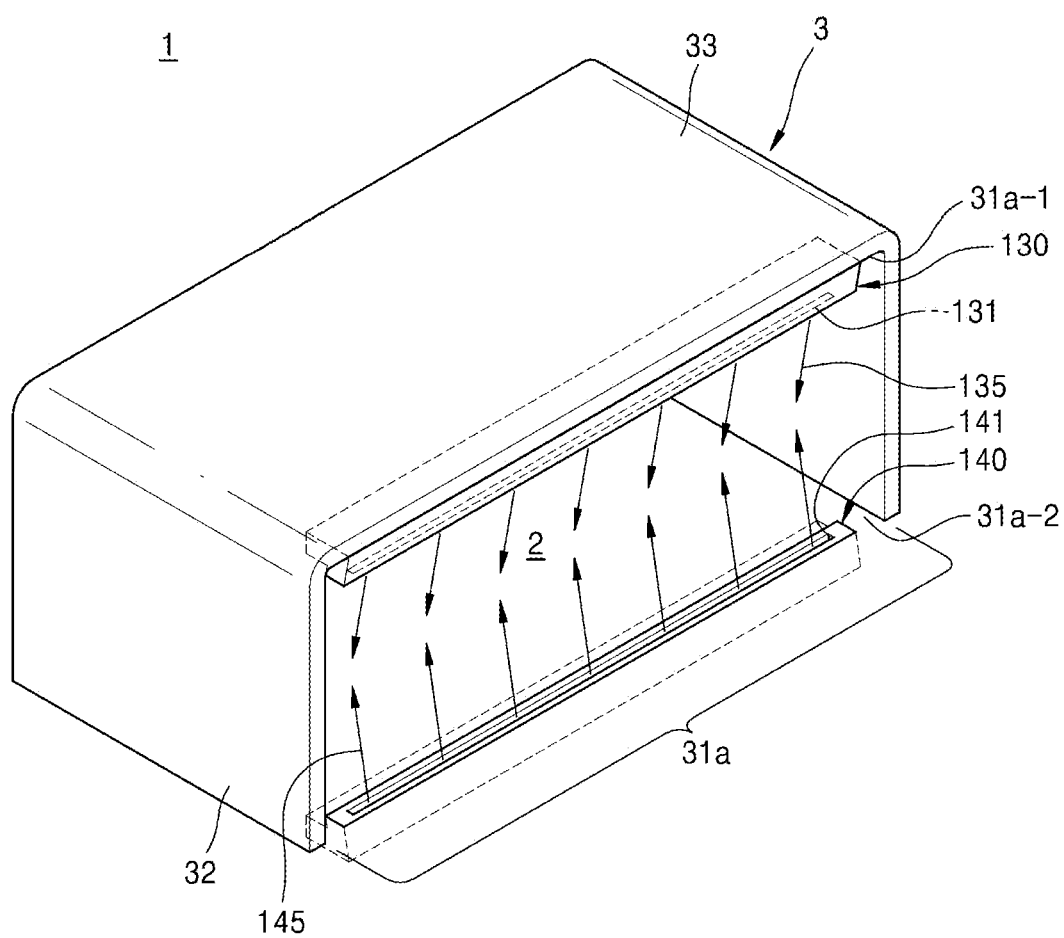
FIG. 4 is a diagram illustrating a blocking device according to some example embodiments.

FIG. 4 is a diagram illustrating some example embodiments of a blocking device. In FIG. 4, the air supply structure for supplying the purified air from the air purifying device 4 to the purification space 2 is omitted and only the structure of the blocking device is illustrated. Referring to FIG. 4, a first opening 31*a* may be provided in the side wall 32. The blocking device may include a vertical blocking device installed at a vertical edge of the first opening 31*a* to eject the purified air vertically across the first opening 31*a*. The vertical blocking device may be connected to the air purifying device 4 to eject the purified air supplied from the air purifying device 4. The vertical blocking device may intake and eject the air inside the purification space 2.

The vertical edge of the first opening 31*a* may include an upper edge 31*a*-1. The vertical blocking device may include a downward blocking device 130 installed at the upper edge 31*a*-1 of the first opening 31 to eject the purified air downward. The downward blocking device 130 may include an air discharge port 131 that is open downward. The air discharge port 131 may have a shape extending in the horizontal direction along the upper edge 31*a*-1. Although not illustrated in the drawings, the air discharge port 131 may be implemented by a plurality of air discharge ports arranged in the horizontal direction. Although not illustrated in the drawings, the downward blocking device 130 may include a blower for discharging the purified air received from the air purifying device 4 or the air inside the purification space 2, through the air discharge port 131. A downward air flow 135 may be formed vertically across the first opening 31*a* by the downward blocking device 130. The downward air flow 135 may function as an air curtain intersecting the first opening 31*a* in the vertical direction. Thus, because unpurified air may be blocked by the downward air flow 135, the unpurified air may not flow into the purification space 2 through the first opening 31*a* or the inflow thereof may be reduced.

The vertical edge of the first opening 31*a* may include a lower edge 31*a*-2. The vertical blocking device may include an upward blocking device 140 installed at the lower edge 31*a*-2 of the first opening 31 to eject the purified air upward. The lower edge 31*a*-2 of the first opening 31 may be substantially a floor on which the partition 3 is installed. The upward blocking device 140 may be connected to the air purifying device 4 and may include an air discharge port 141 that is open upward. The air discharge port 141 may have a shape extending in the horizontal direction along the lower edge 31*a*-2. Although not illustrated in the drawings, the air discharge port 141 may be implemented by a plurality of air discharge ports arranged in the horizontal direction. Although not illustrated in the drawings, the upward blocking device 140 may include a blower for discharging the purified air received from the air purifying device 4 or the air inside the purification space 2, through the air discharge port 141. An upward air flow 145 may be formed vertically across the first opening 31*a* by the upward blocking device 140. The upward air flow 145 may function as an air curtain intersecting the first opening 31*a* in the vertical direction. Thus, because unpurified air may be blocked by the upward air flow 145, the unpurified air may not flow into the purification space 2 through the first opening 31*a* or the inflow thereof may be reduced. Also, because the upward blocking device 140 may block the external air flowing near the floor, the upward blocking device 140 may effectively block the dust on the floor from flowing into the purification space 2.

Figure 5:
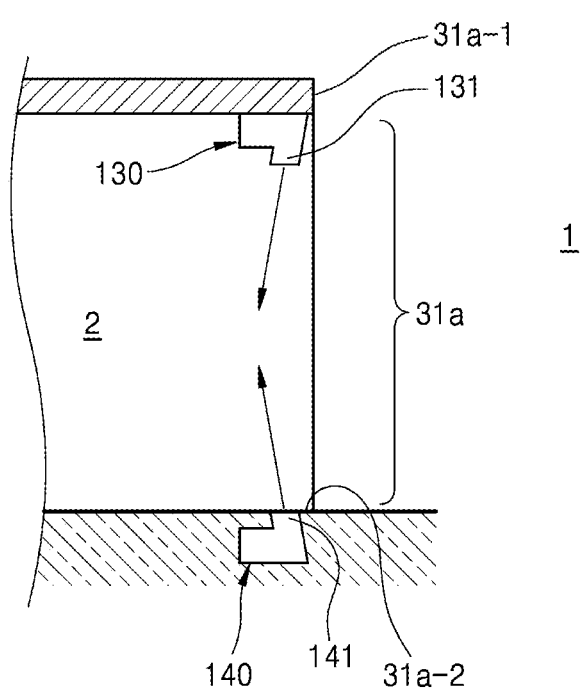
FIG. 5 is a cross-sectional view of the blocking device illustrated in FIG. 4 according to some example embodiments.

FIG. 5 is a cross-sectional view of the blocking device illustrated in FIG. 4. Referring to FIG. 5, a vertical flow device may eject the purified air toward the purification space 2 at an angle with respect to the vertical direction. For example, the downward air discharge port 131 and the upward air discharge port 141 may be formed to be inclined toward the purification space 2 with respect to the vertical direction. According to this configuration, because the purified air ejected through the downward air discharge port 131 and the upward air discharge port 141 may be directed toward the purification space 2, the amount of leakage of the purified air to the external space 1 may be reduced.

Figure 6:
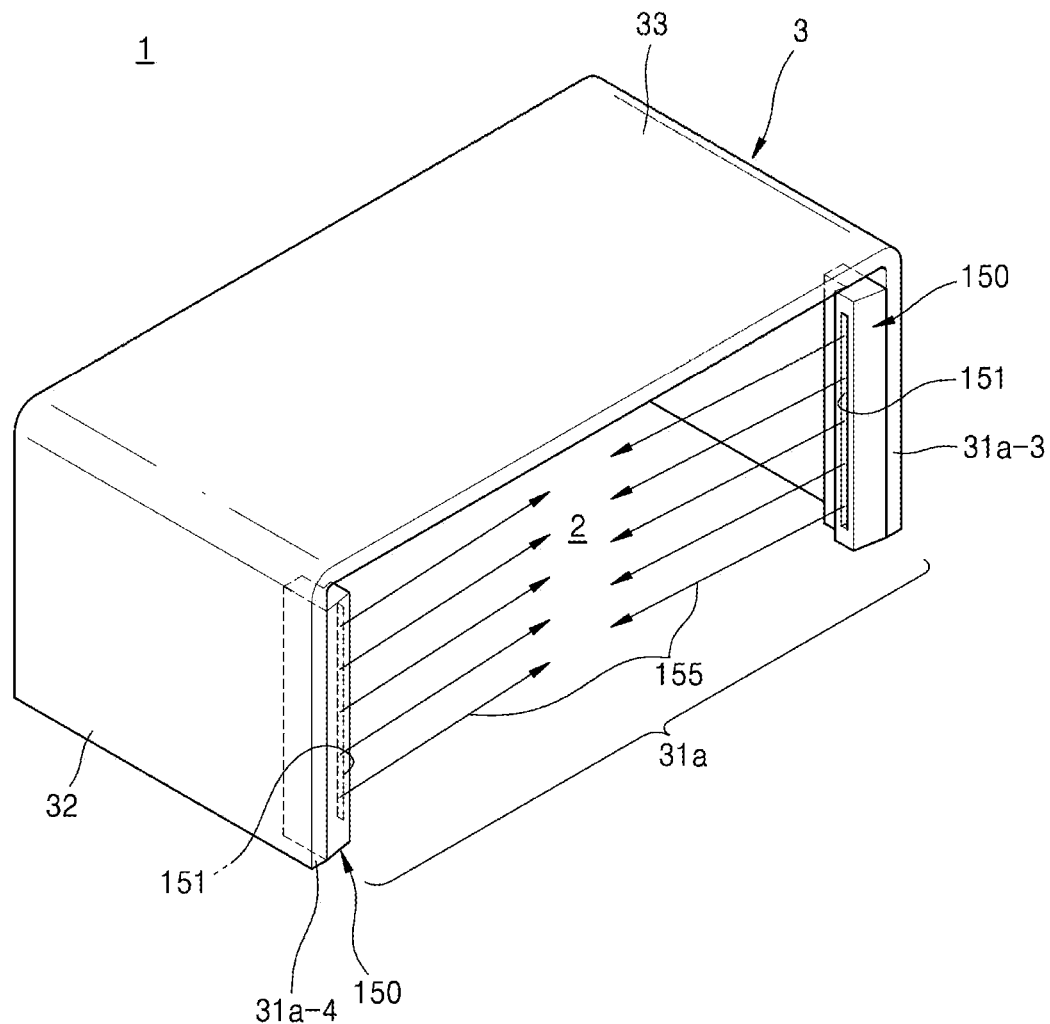
FIG. 6 is a diagram illustrating a blocking device according to some example embodiments.

FIG. 6 is a diagram illustrating some example embodiments of a blocking device. In FIG. 6, the air supply structure for supplying the purified air from the air purifying device 4 to the purification space 2 is omitted and only the structure of the blocking device is illustrated. Referring to FIG. 6, a first opening 31*a* may be provided in the side wall 32. The blocking device may include a horizontal blocking device 150 installed at one or more of horizontal edges 31*a*-3 and 31*a*-4 of the first opening 31*a* to eject the purified air horizontally across the first opening 31*a*. The horizontal blocking device 150 may be connected to the air purifying device 4 to eject the purified air supplied from the air purifying device 4. The horizontal blocking device 150 may intake and eject the air inside the purification space 2.

In some example embodiments, the horizontal blocking device 150 may be installed at each of the horizontal edges 31*a*-3 and 31*a*-4 of the first opening 31*a* to eject the air in the opposite directions in the horizontal direction. The horizontal blocking device 150 may be connected to the air purifying device 4 and may include an air discharge port 151 that is open in the horizontal direction. The air discharge port 151 may have a shape extending in the vertical direction along the horizontal edges 31*a*-3 and 31*a*-4. Although not illustrated in the drawings, the air discharge port 151 may be implemented by a plurality of air discharge ports arranged in the vertical direction. Although not illustrated in the drawings, the horizontal blocking device 150 may include a blower for discharging the purified air received from the air purifying device 4 or the air of the purification space 2, through the air discharge port 151. An air flow 155 may be formed horizontally across the first opening 31*a* by the horizontal blocking device 150. The air flow 155 may function as an air curtain intersecting the first opening 31*a* in the horizontal direction. Thus, because unpurified air may be blocked by the air flow 155, the unpurified air may not flow into the purification space 2 through the first opening 31*a* or the inflow thereof may be reduced. The blocking device illustrated in FIG. 4 may be applied to the blocking device illustrated in FIG. 6.

Figure 7:
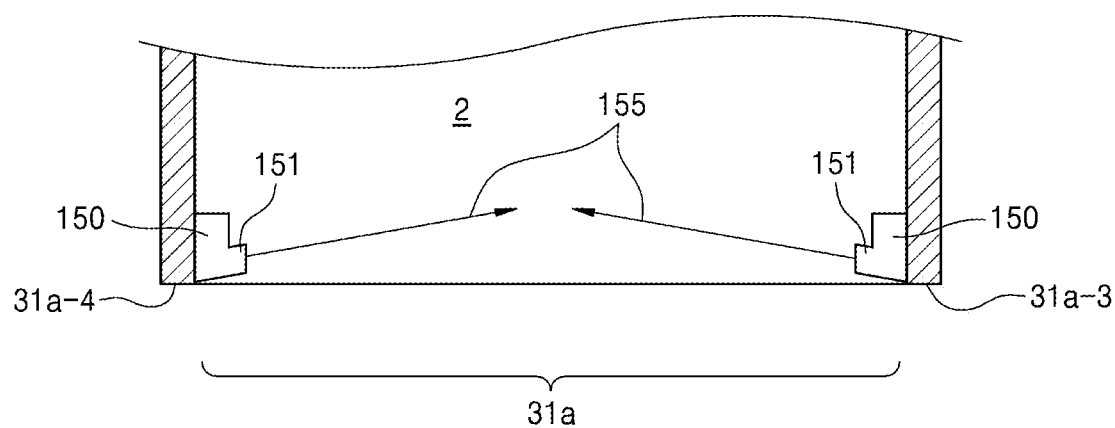
FIG. 7 is a cross-sectional view of the blocking device illustrated in FIG. 6 according to some example embodiments.

FIG. 7 is a cross-sectional view of the blocking device illustrated in FIG. 6. Referring to FIG. 7, the horizontal blocking device 150 may eject the purified air toward the purification space 2 at an angle with respect to the horizontal direction. For example, the air discharge port 151 may be formed to be inclined toward the purification space 2 with respect to the horizontal direction. According to this configuration, because the purified air ejected through the air discharge port 151 may be directed toward the purification space 2, the amount of leakage of the purified air to the external space 1 may be reduced.

Figure 8:
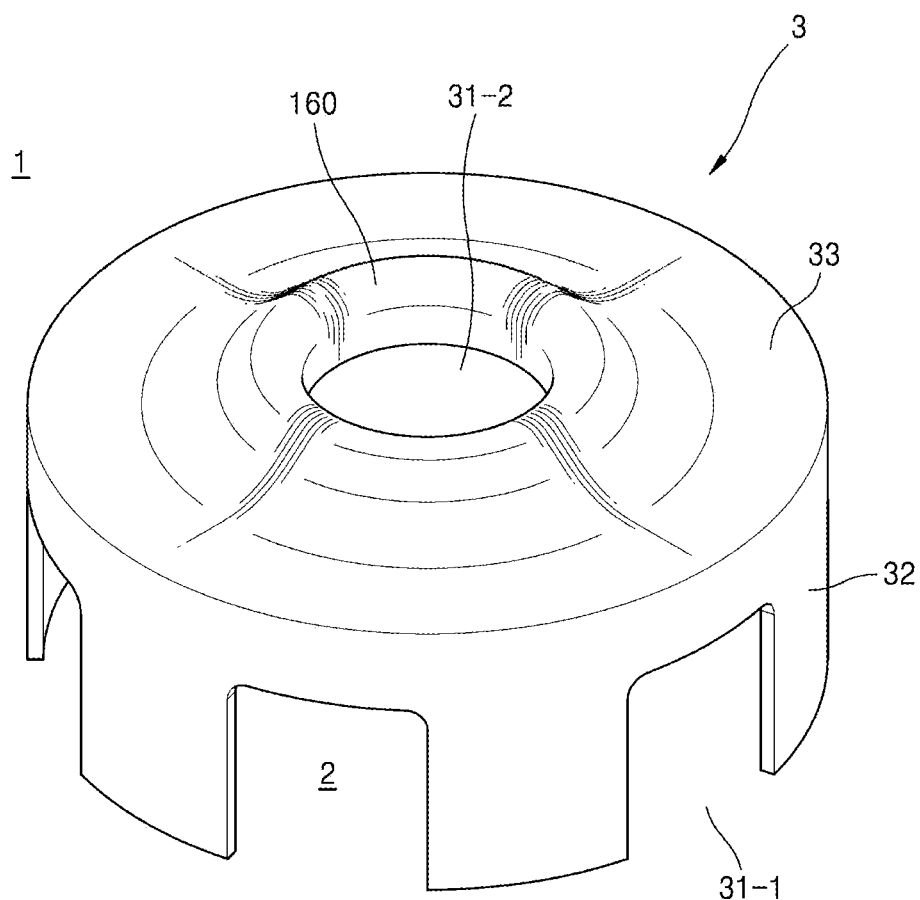
FIG. 8 is a diagram illustrating a blocking device according to some example embodiments.

FIG. 8 is a diagram illustrating some example embodiments of a blocking device. In FIG. 8, the main supply structure for supplying the purified air from the air purifying device 4 to the purification space 2 is omitted and only the structure of the blocking device is illustrated. Referring to FIG. 8, a partition 3 may include a side wall 32 forming a horizontal boundary of the purification space 2 and an upper wall 33 forming a vertical boundary of the purification space 2. A plurality of first openings 31-1 may be provided in the side wall 32. A second opening 31-2 may be provided in the upper wall 33. The blocking device of some example embodiments may reduce or prevent the external air from flowing into the purification space 2 through the second opening 31-2, by using the flow of air flowing along the upper wall 33 in the external space 1. For example, referring to FIG. 8, the blocking device may be implemented by a streamlined dome structure 160 provided around the second opening 31-2. The streamlined dome structure 160 may have a shape for guiding the external air flowing along the outer surface thereof to flow outside across the second opening 31-2. By this configuration, the external air may be reduced or prevented from flowing into the purification space 2 through the second opening 31-2 or the inflow thereof may be reduced. Also, when the external air flows across the second opening 31-2 along the streamlined dome structure 160, a negative pressure may be generated around the second opening 31-2. Thus, because a flow of air from the purification space 2 toward the external space 1 may be formed around the second opening 31-2, it may be difficult for the external air to pass through the second opening 31-2 and then flow into the purification space 2.

Example embodiments of the air cleaning system described above may be applied in various ways.

Figure 9:
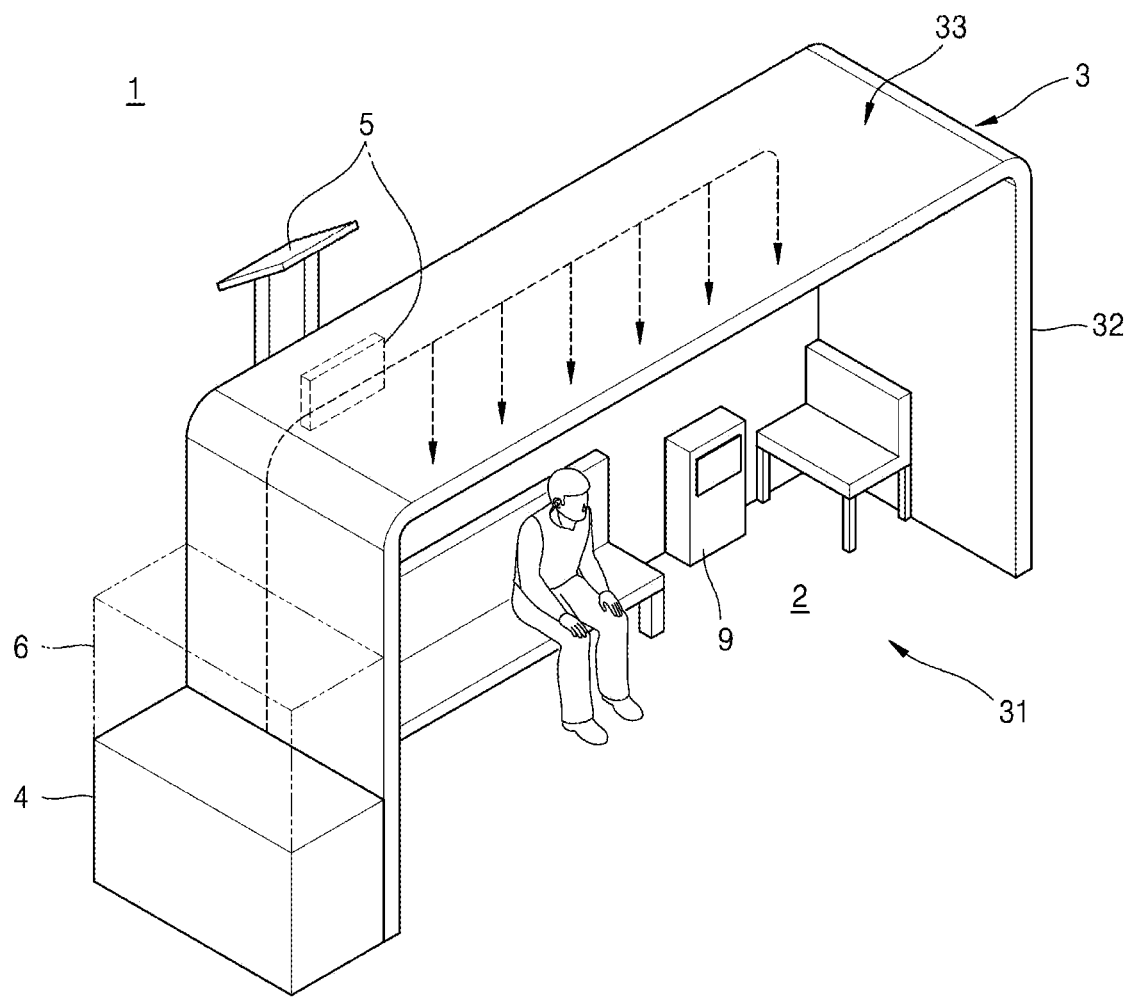
FIG. 9 is a perspective view illustrating an example of an air cleaning system installed at a bus stop according to some example embodiments.

FIG. 9 is a perspective view illustrating an example of an air cleaning system installed at a bus stop. Referring to FIG. 9, a purification space 2 may be defined by a partition 3. The purification space 2 may be a waiting space for a passenger waiting for a bus. An opening 31 may function as an entrance for the passenger. The air purifying device 4 may be installed outside a side wall 32. The air purifying device 4 may supply purified air to the purification space 2. The temperature adjusting device 6 may adjust the internal temperature of the purification space 2. At least a portion of the side wall 32 and an upper wall 33 may be transparent. A solar cell may be installed on the upper wall 33. The blocking devices illustrated in FIGS. 3 to 7 may be applied to the air cleaning system of the bus stop illustrated in FIG. 9.

Figure 10:
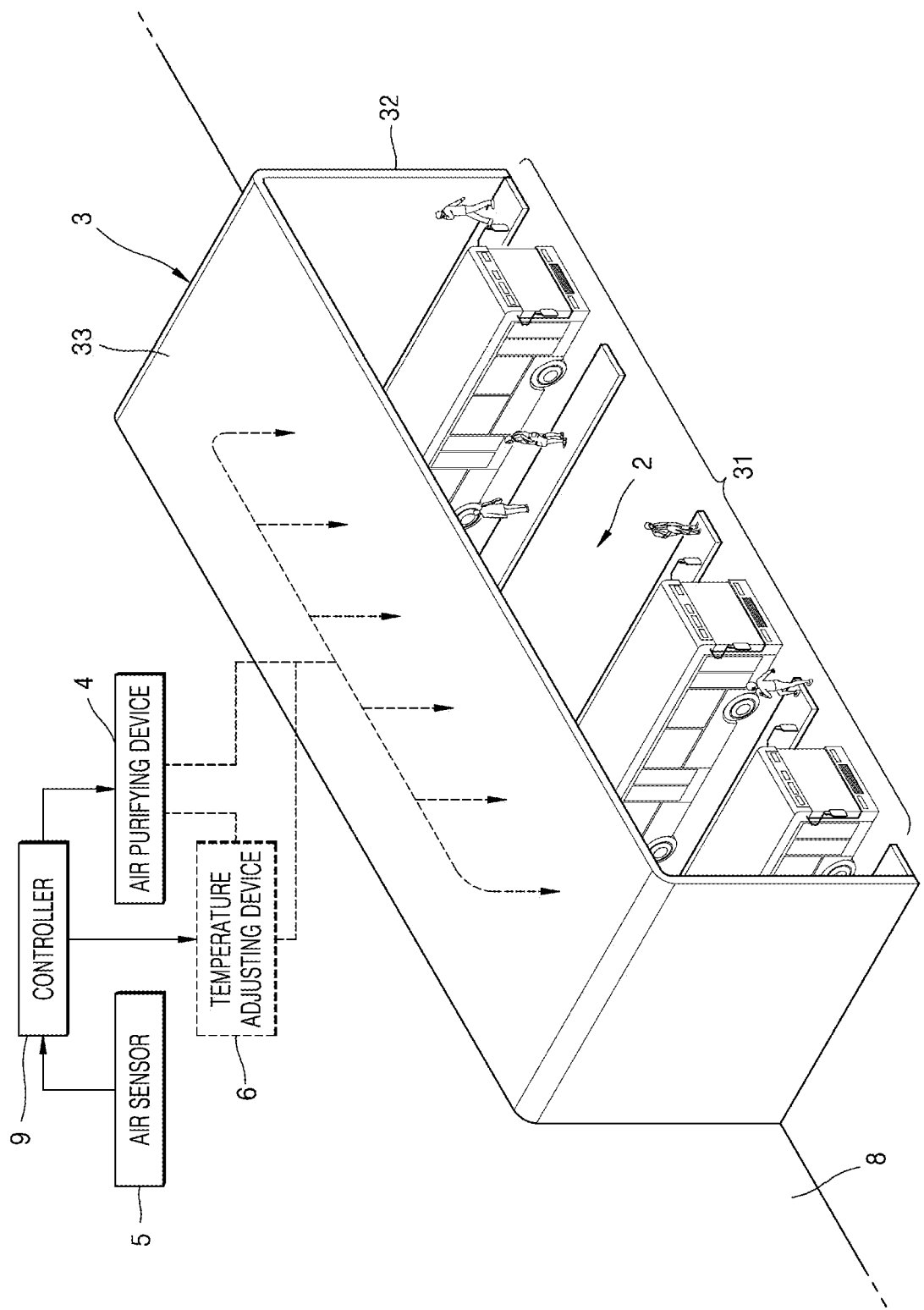
FIG. 10 is a perspective view illustrating an example of an air cleaning system installed at a bus terminal according to some example embodiments.

FIG. 10 is a perspective view illustrating an example of an air cleaning system installed at a bus terminal. Referring to FIG. 10, a purification space 2 may be defined by a partition 3. The partition 3 may be implemented by a side wall 32, an upper wall 33, and one side wall 8 of the main building of the bus terminal. The purification space 2 may be a bus boarding space. An opening 31 provided in the side wall 32 may function as an entrance for a bus. A passenger may enter and exit the purification space 2 through the opening 31. Also, although not illustrated in the drawings, the passenger may enter and exit the purification space 2 through an entrance provided at one side wall 8 of the main building of the bus terminal. At least a portion of the side wall 32 and the upper wall 33 may be transparent. A solar cell may be installed on the upper wall 33. The air purifying device 4 may be installed outside the purification space 2 and may supply purified air to the purification space 2 through a duct (not illustrated). The temperature adjusting device 6 may adjust the internal temperature of the purification space 2. The blocking devices illustrated in FIGS. 3 to 7 may be applied to the air cleaning system of the bus terminal illustrated in FIG. 10.

Figure 11:
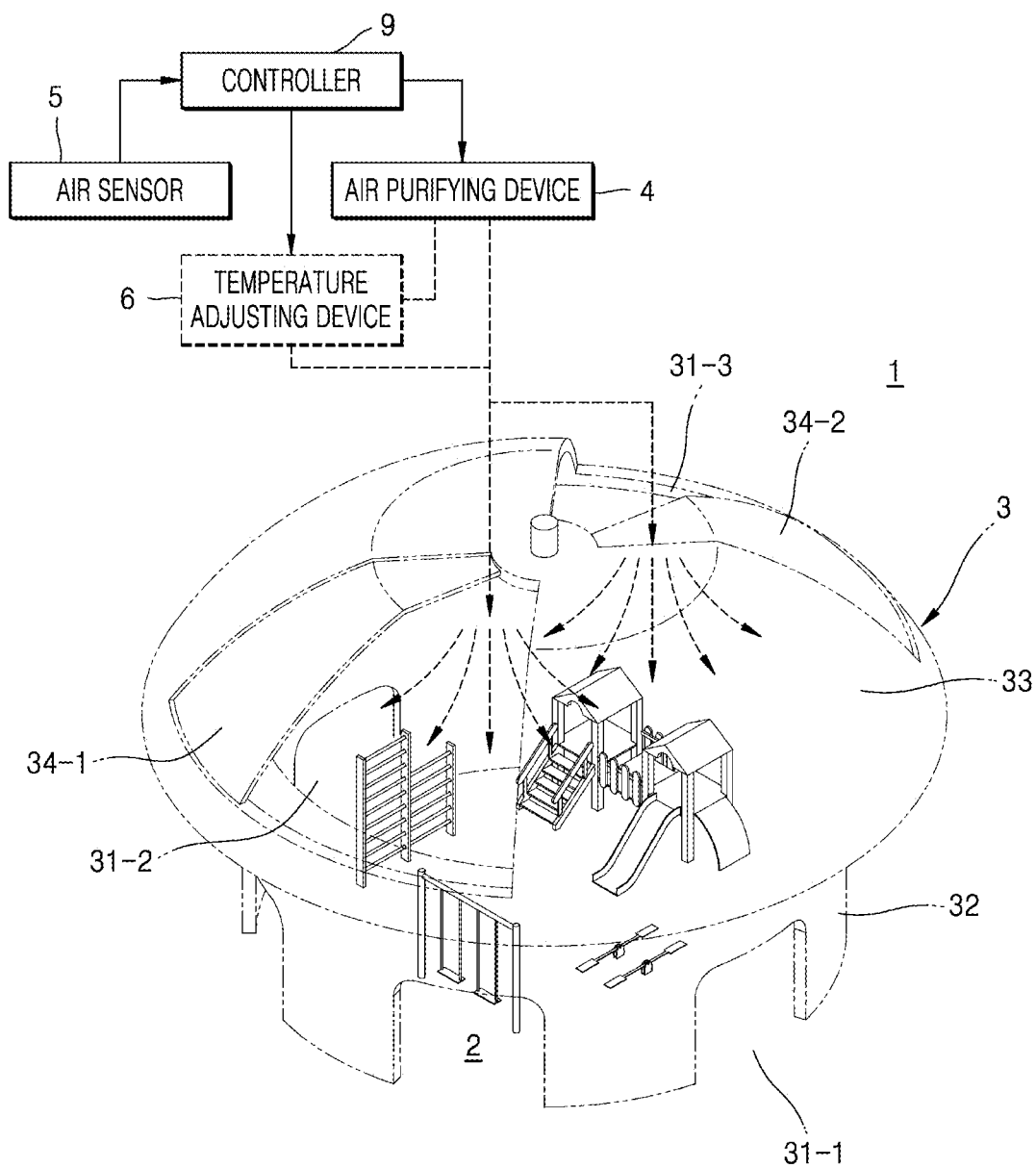
FIG. 11 is a perspective view illustrating an example of an air cleaning system installed at a playground according to some example embodiments.

FIG. 11 is a perspective view illustrating an example of an air cleaning system installed at a playground. Referring to FIG. 11, the structure of the partition 3 illustrated in FIG. 2 may be used to define a purification space 2 by surrounding a playground in which a plurality of play apparatuses are installed. The partition 3 of some example embodiments may include a side wall 32 that is generally cylindrical and an upper wall 33 forming a roof. A plurality of first openings 31-1 may be provided in the side wall 32. The plurality of first openings 31-1 may function as an entrance to the purification space 2. At least a portion of the side wall 32 and the upper wall 33 may be transparent. Second openings 31-2 and 31-3 may be provided in the upper wall 33 to improve the openness of the playground. The second openings 31-2 and 31-3 may be opened and closed by movable walls 34-1 and 34-2. As necessary, the controller 9 may drive the movable walls 34-1 and 34-2 to close the second openings 31-2 and 31-3 or to partially or entirely open the second openings 31-2 and 31-3. The movable walls 34-1 and 34-2 may be transparent. Although not illustrated in the drawings, a movable wall for opening and closing the first opening 31-1 may be provided. The air purifying device 4 may supply purified air to the purification space 2. The temperature adjusting device 6 may adjust the internal temperature of the purification space 2. The blocking devices illustrated in FIGS. 3 to 7 may be applied to the air cleaning system of the playground illustrated in FIG. 11.

Figure 12:
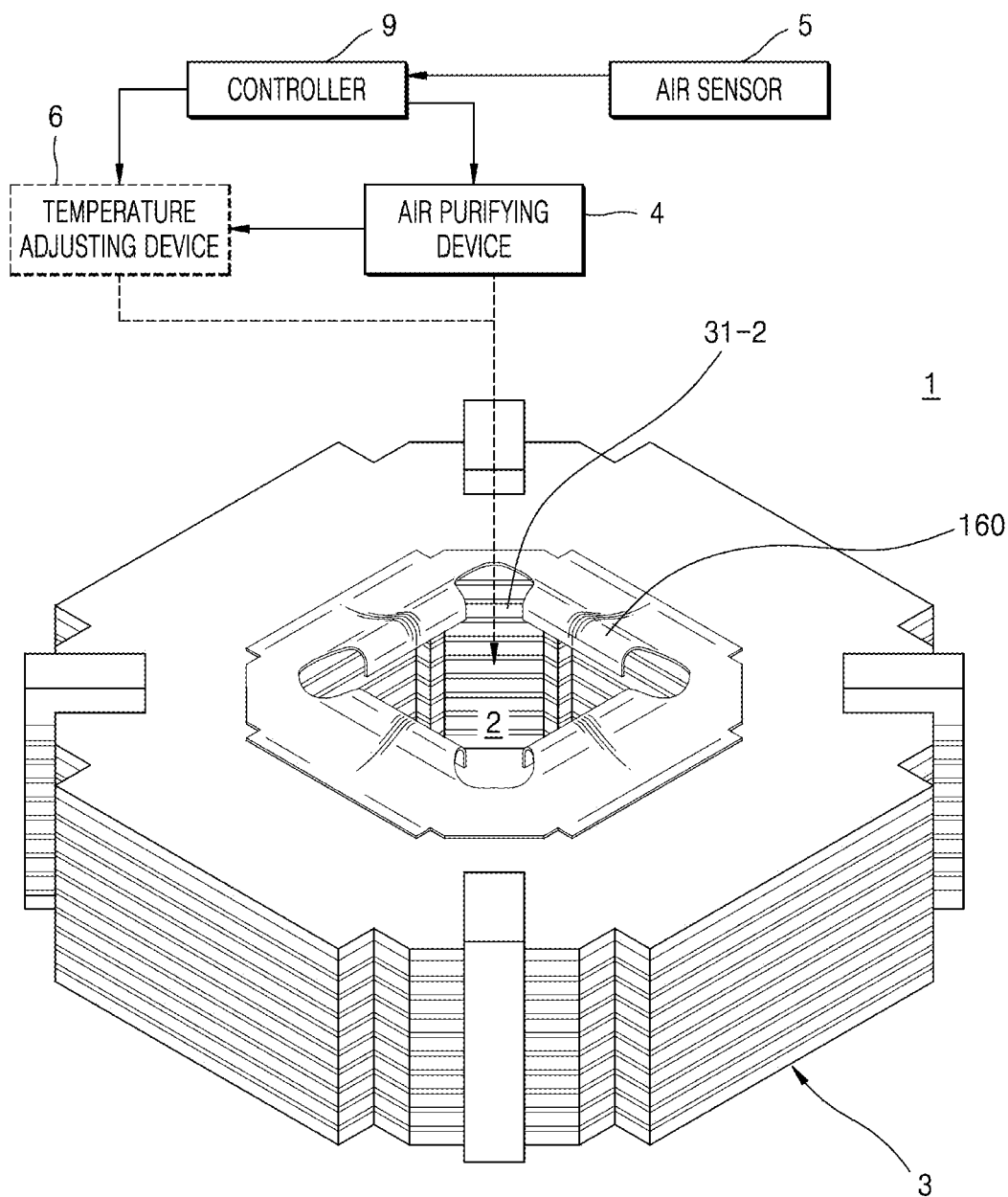
FIG. 12 is a perspective view illustrating an example of an air cleaning system installed in a courtyard of a building according to some example embodiments.

FIG. 12 is a perspective view illustrating an example of an air cleaning system installed in a courtyard of a building. Referring to FIG. 12, in some example embodiments, the courtyard may be a purification space 2. A partition 3 may be implemented by the buildings that horizontally surround the courtyard. An upper portion of the courtyard may be opened by a second opening 31-2. The air purifying device 4 may supply purified air to the purification space 2. The temperature adjusting device 6 may adjust the internal temperature of the purification space 2. Some example embodiments illustrated in FIG. 8 may be applied as a blocking device for blocking the purified air from flowing out from the purification space 2 through the second opening 31-2. The blocking device may be implemented by a streamlined dome structure 160 provided around the second opening 31-2.

Any of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to some example embodiments of the air cleaning system, it may be possible to more efficiently clean outdoor air by forming a purification space somewhat isolated from the external space while maintaining some sense of openness.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. An outdoor air cleaning system comprising:
   a partition surrounding a purification space to isolate the purification space from an external space and having at least one opening connecting the purification space to the external space;
   an air purifying device configured to supply purified air to the purification space;
   a controller configured to control the air purifying device;
   a temperature adjusting device configured to form a temperature gradient between the purification space and the external space, and
   a blocking device including at least one flow device installed adjacent to the at least one opening,
   wherein the at least one flow device has a discharge port having an angle directed to the purification space such that the at least one flow device is configured to eject the purified air towards the purification space,
   wherein an openness level is about 10% or more and about 50% or less, and
   wherein the openness level is an area ratio of the at least one opening with respect to a total surface area of the partition surrounding the purification space.
2. The outdoor air cleaning system of claim 1, wherein the openness level is about 20% or more.
3. The outdoor air cleaning system of claim 1, wherein a volume of the purification space is about 100,000 cubic meters or less.
4. The outdoor air cleaning system of claim 1, wherein at least a portion of the partition is transparent.
5. The outdoor air cleaning system of claim 1, further comprising a movable wall arranged to open and close at least a portion of the opening.
6. The outdoor air cleaning system of claim 1, wherein the partition includes a side wall forming a horizontal boundary between the purification space and the external space and an upper wall forming a vertical boundary between the purification space and the external space, and
   the opening is in at least one of the side wall and the upper wall.
7. The outdoor air cleaning system of claim 6, wherein the blocking device is configured to block unpurified air from flowing from the external space into the purification space through the opening.
8. The outdoor air cleaning system of claim 7, wherein the at least one flow device is a vertical flow device configured to receive the purified air from the air purifying device and configured to form a downward air flow from an upper portion of the purification space,
   wherein the blocking device further includes a horizontal flow device configured to receive the purified air from the air purifying device and further configured to form a horizontal air flow along the side wall inside the purification space.
9. The outdoor air cleaning system of claim 8, wherein the opening includes a second opening in the upper wall, and
   the blocking device further includes a streamlined dome structure around the second opening.
10. The outdoor air cleaning system of claim 7, wherein the opening includes a first opening in the side wall, and
    the blocking device further includes a vertical blocking device at a vertical edge of the first opening configured to eject the purified air supplied from the air purifying device, vertically across the first opening.
11. The outdoor air cleaning system of claim 10, wherein the vertical blocking device configured to eject the purified air toward the purification space at an angle with respect to a vertical direction.
12. The outdoor air cleaning system of claim 10, wherein the vertical blocking device includes a downward blocking device at an upper edge of the first opening configured to eject the purified air downward.
13. The outdoor air cleaning system of claim 10, wherein the vertical blocking device includes an upward blocking device at a lower edge of the first opening configured to eject the purified air upward.
14. The outdoor air cleaning system of claim 7, wherein the opening includes a first opening in the side wall, and
    the blocking device further includes a horizontal blocking device at a horizontal edge of the first opening configured to eject the purified air supplied from the air purifying device horizontally across the first opening.
15. The outdoor air cleaning system of claim 14, wherein the horizontal blocking device configured to eject the purified air toward the purification space at an angle with respect to a horizontal direction.
16. An outdoor air cleaning system comprising:
    a partition surrounding a purification space to isolate the purification space from an external space and having at least one opening connecting the purification space to the external space;
    an air purifying device configured to supply purified air to the purification space; and a temperature adjusting device configured to form a temperature gradient between the purification space and the external space, and a blocking device including at least one flow device installed adjacent to the at least one opening, wherein the at least one flow device has a discharge port having an angle directed to the purification space such that the at least one flow device is configured to eject the purified air towards the purification space, wherein an openness level is about 20% or more, and wherein the openness level is an area ratio of the at least one opening with respect to a total surface area of the partition surrounding the purification space.

17. The outdoor air cleaning system of claim 16, wherein at least a portion of the partition is transparent.

18. The outdoor air cleaning system of claim 16, further comprising a movable wall arranged to open and close at least a portion of the opening.

19. The outdoor air cleaning system of claim 16, wherein the openness level is about 50% or less.

* * * * *